(12) United States Patent
Iwakata

(10) Patent No.: US 6,428,015 B1
(45) Date of Patent: Aug. 6, 2002

(54) LIQUID SEAL STRUCTURE

(75) Inventor: Keisaku Iwakata, Oyama (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/553,402

(22) Filed: Apr. 20, 2000

(30) Foreign Application Priority Data

Apr. 23, 1999 (JP) ............................................ 11-116533

(51) Int. Cl.$^7$ ................................................ F16J 15/32
(52) U.S. Cl. ........................ 277/563; 277/559; 277/571
(58) Field of Search .............................. 277/571, 559, 277/560, 562, 563, 566, 589

(56) References Cited

U.S. PATENT DOCUMENTS

| | | | |
|---|---|---|---|
| 4,106,781 A | * | 8/1978 | Benjamin et al. ............ 277/559 |
| 4,513,976 A | * | 4/1985 | Bentley et al. ............. 277/559 |
| 5,209,502 A | | 5/1993 | Savioa |
| 6,024,362 A | * | 2/2000 | Fedorovich ................. 271/571 |

* cited by examiner

Primary Examiner—Anthony Knight
Assistant Examiner—Enoch Peavey
(74) Attorney, Agent, or Firm—Armstrong, Westerman & Hattori, LLP

(57) ABSTRACT

A liquid seal structure has a tapered seal land provided on an outer circumference of a rotation shaft with an outer circumference on a sealing liquid side being diametrally larger than an outer circumference opposite to the liquid side, a tapered seal lip in contact with the outer circumference of the tapered seal land, and a seal lip support member for supporting the tapered seal lip. As a result, even when liquid invades into a seal surface between the tapered seal land and the tapered seal lip, the liquid moves elevationally by a centrifugal force in accordance with rotation of the rotation shaft to be returned to the sealing liquid side on account of sealing by a tapered surface. Therefore, the liquid does not leak to a gas side, so that sealability can be secured for a long time to perform stable sealing.

13 Claims, 4 Drawing Sheets

LIQUID SEAL STRUCTURE

BACKGROUND OF THE INVENTION

1. Field of the Invention

The present invention relates to a liquid seal structure for sealing oil and other liquid at a rotation shaft of an internal combustion engine, etc.

2. Description of Related Art

Conventionally, liquid seal structure has been used to with an internal combustion engine for preventing leaks of lubricant oil sealed inside a case at an output portion of a rotation shaft. Such liquid seal structure often also works for preventing invasion of dust from the outside.

U.S. Pat. No. 5,209,502 discloses a conventional liquid seal structure of rotation shaft.

As shown in FIG. 7 herein, the seal mechanism has a seal member 71 composed of a seal lip 71A made of Teflon (trademark of Dupont: polytetrafluoroethylene) or fluoropolymers in contact with an outer circumference of the rotation shaft 5 and dust seal lip 71B standing back to back with the seal lip 71A and in contact with the outer circumference of the rotation shaft 5, the seal member 71 sandwiched by an inner case 73 and an outer case 74 constituting a seal lip support member 72. The seal lip support member 72 is press-fitted to a housing 6 provided on a cylinder block of the engine.

The seal lip 71A is disposed toward the inside of the engine (liquid side) to seal the oil in the engine and the dust seal lip 71B is disposed toward the outside of the engine (gas side).

The seal lip 71A of the seal mechanism is a disc shape having inner diameter smaller than the diameter of the rotation shaft 5 and outer diameter larger than the diameter of the rotation shaft 5. The dust seal lip 71B has a disc shape having inner diameter smaller than the diameter of the rotation shaft 5 and larger than the inner diameter of the seal lip 71A and having the same outer diameter as the outer diameter of the seal lip 71A. When the rotation shaft 5 is pressed into the inner diameter of the seal lip 71A, the outer circumference of the rotation shaft 5 touches and slides on an end of the seal lip 71A, the contact surface being a seal surface 71C. At this time, inner end of the dust seal lip 71B also touches to the outer circumference of the rotation shaft 5. Further, a spiral groove 71D is formed on the seal surface 71C of the seal lip 71A against the rotation shaft 5, so that sealing can be made efficient using a pumping effect (an effect to push back oil etc.) of the groove 71D.

However, in the above-described seal mechanism, since the pumping effect is lost when the spiral groove 71D on the seal surface 71C of the rotation shaft 5 and the seal lip 71A is worn or when the groove 71D is packed by sludge, sealing effect can be lost to allow an oil leak.

Further, when the oil oozes out or leaks from the seal lip 71A, the oil can leak out to the outside through the dust seal lip 71B.

SUMMARY OF THE INVENTION

An object of the present invention is to provide a liquid seal structure capable of stably sealing for a long time.

A liquid seal structure according to the present invention is for preventing liquid on a liquid side from leaking toward a gas side, characterized in having: a tapered seal land provided on an outer circumference of a rotation shaft and having an outer circumference with a larger diameter on the liquid side than on the gas side; a tapered seal lip in contact with the outer circumference of the tapered seal land so that a contact surface forms a seal surface; and a seal lip support member for supporting the tapered seal lip.

According to the present invention, when the liquid, such as oil, invades into the seal surface between the tapered seal land and the tapered seal lip, since the seal surface is tapered, the liquid is returned to the side of the liquid to be sealed by moving elevationally, i.e. to the large diameter side of the tapered seal land on account of centrifugal force in accordance with the rotation of the rotation shaft. Accordingly, the liquid does not leak to the gas side, so that sealability can be secured for a long time to perform stable sealing. As a result, for instance, when the tapered seal lip has a groove. such as a helical groove, and sludge is packed in the groove or the groove is worn out, there is little influence on the sealing effect.

In the present invention, the tapered seal land is preferably independent from the rotation shaft and made of metal material, such as steel, sintered metal or metal sheets press-fitted to the rotation shaft. However, the rotation shaft itself may be carved to provide the tapered seal land. Plastic material may be used for the tapered seal land, however, since the tapered seal land can be heated during rotation, the aforesaid metal material is more preferable than the plastic material which is inferior in heat conduction.

The tapered angle of the tapered seal land is not specifically restricted but may be tapered in any manner from a gentle angle to a steep tapered angle, except for a right angle, as long as the liquid moves elevationally by the centrifugal force. Further, the width of the seal surface between the tapered seal land and the tapered seal lip is not specifically restricted but preferably as wide as possible. This is because the wider seal surface has a larger free-running effect (slinger effect) of the oil. Further, Teflon material is preferably used for the tapered seal lip, but other soft material having flexibility can also be used.

In the present invention, a groove may preferably be formed on at least one of the contact surfaces of the tapered seal land and the tapered seal lip.

According to the above arrangement, the leaked liquid goes into the groove and is unlikely to advance further outside in addition to the elevational movement of the liquid, such as oil, by the centrifugal force in accordance with rotation of the rotation shaft, thus obtaining further sealability. Further, when the groove is a helical groove, further improved sealability can be secured by the pumping effect of the groove In the above, the groove includes helical grooves and multiple grooves. The depth of the groove is preferably approximately half (40 to 50%) of lip thickness. When the groove is a helical groove, the helix direction of the helical groove is the direction for pushing back the liquid, such as oil, though different in accordance with the rotation of the rotation shaft.

In the above, a dust seal lip for preventing invasion of dust from the gas side may preferably be provided on the outer circumference of the rotation shaft.

According to the above arrangement, since invasion of the dust or the like from the outside to the side of the liquid to be sealed can be prevented, damage on the seal surface between the tapered seal land and the tapered seal lip can be prevented, thus improving durability of the liquid seal structure.

In the above arrangement, the dust seal lip may be integrated with the tapered seal lip or may be provided as an independent body.

In the above liquid seal structure, the tapered seal lip and the dust seal lip may be integrated.

Accordingly, since the tapered seal lip and the dust seal lip are not necessary to be manufactured separately, production labor can be reduced.

Alternatively, the tapered seal lip and the dust seal lip may be independently formed.

Accordingly, since the tapered seal lip and the dust seal lip are separate bodies, the tapered seal lip and the dust seal lip can be manufactured easily. Further, since the dust seal lip can be formed in an appropriate form, the dust sealing property can be improved.

The liquid seal structure of the present invention may preferably have a liquid pool provided on the outer circumference of the tapered seal land for collecting the liquid.

Accordingly, even when the liquid leaks out from the seal surface between the tapered seal land and the tapered seal lip, the liquid is collected in the liquid pool, so that liquid leakage to the outside can be prevented by a self-collection function where the liquid moves to a lower part of the shaft through the groove and is collected again to the inside of the engine. Therefore, sealability can be secured for a long time to perform stable sealing.

In the above, the liquid seal structure may further include: a seal member opposite to the liquid pool; and a cylindrical liquid block on a surface of the seal member opposite to the liquid pool.

Accordingly, the liquid, such as oils leaked through the seal member is blocked by the liquid block to be dropped into the liquid pool. The liquid in the liquid pool moves to the lower part of the shaft and is re-collected to the inside of the engine by the self-collection function, so that the leakage of the liquid to the outside can be prevented, thus securing sealability for a long time.

The configuration of the liquid block is not restricted as long as the liquid transmitted through the seal member can be blocked. For instance, the liquid block may be a projecting portion formed by cutting into the inner circumference of the seal member, or a molding having square or triangle cross section attached to the inner circumference of the seal member.

In the liquid seal structure according to the present invention, a liquid pool for collecting the liquid may alternatively be provided on an inner circumference of the tapered seal lip.

Accordingly, even when the liquid leaks out from the seal surface between the tapered seal land and the tapered seal lip, the liquid is collected in the liquid pool, so that liquid leakage to the outside can be prevented by the self-collection function where the liquid moves to a lower part of the shaft through the groove and is collected again to the inside of the engine. Therefore, sealability can be secured for a long time to perform stable sealing. Since both of the components are not manufactured separately, production labor can be reduced.

In the above arrangement, a seal land may preferably be provided opposite to the liquid pool and a cylindrical liquid block may preferably be provided on a surface of the seal land opposite to the liquid pool.

According to the present invention, the liquid leaked out from the seal surface between the tapered seal land and the tapered seal lip is blocked by the liquid block and drops to the liquid pool. The liquid in the liquid pool moves to the lower part of the shaft and is re-collected to the inside of the engine by the self-collection function, so that the leakage of the liquid to the outside can be prevented, thus securing sealability for a long time.

In the above, a diameter at which the seal land and the seal lip touches on both ends of the liquid pool in an axial direction of the rotation shaft may preferably be larger on the liquid side than on the gas side.

According to the above arrangement, since the liquid collected in the liquid pool moves in a direction elevating by the centrifugal force, i.e. larger diameter side, the leakage of the liquid to the outside can be prevented, so that sealability can be secured for a long time.

In the above, the seal member may preferably be integrated with at least one of the tapered seal lip and the dust seal lip.

Accordingly, since both components are not necessary to be made separately, production labor can be reduced.

In the above, the tapered seal land may preferably be independent from the rotation shaft.

Accordingly, since the tapered seal land can be easily manufactured by changing the tapered angle as desired and complicated processing on the rotation shaft is not necessary, production labor for the process can be omitted.

DETAILED DESCRIPTION OF PREFERRED EMBODIMENT(S)

An embodiment of the present invention will be described below with reference to attached drawings.

[First Embodiment]

Figure 1:
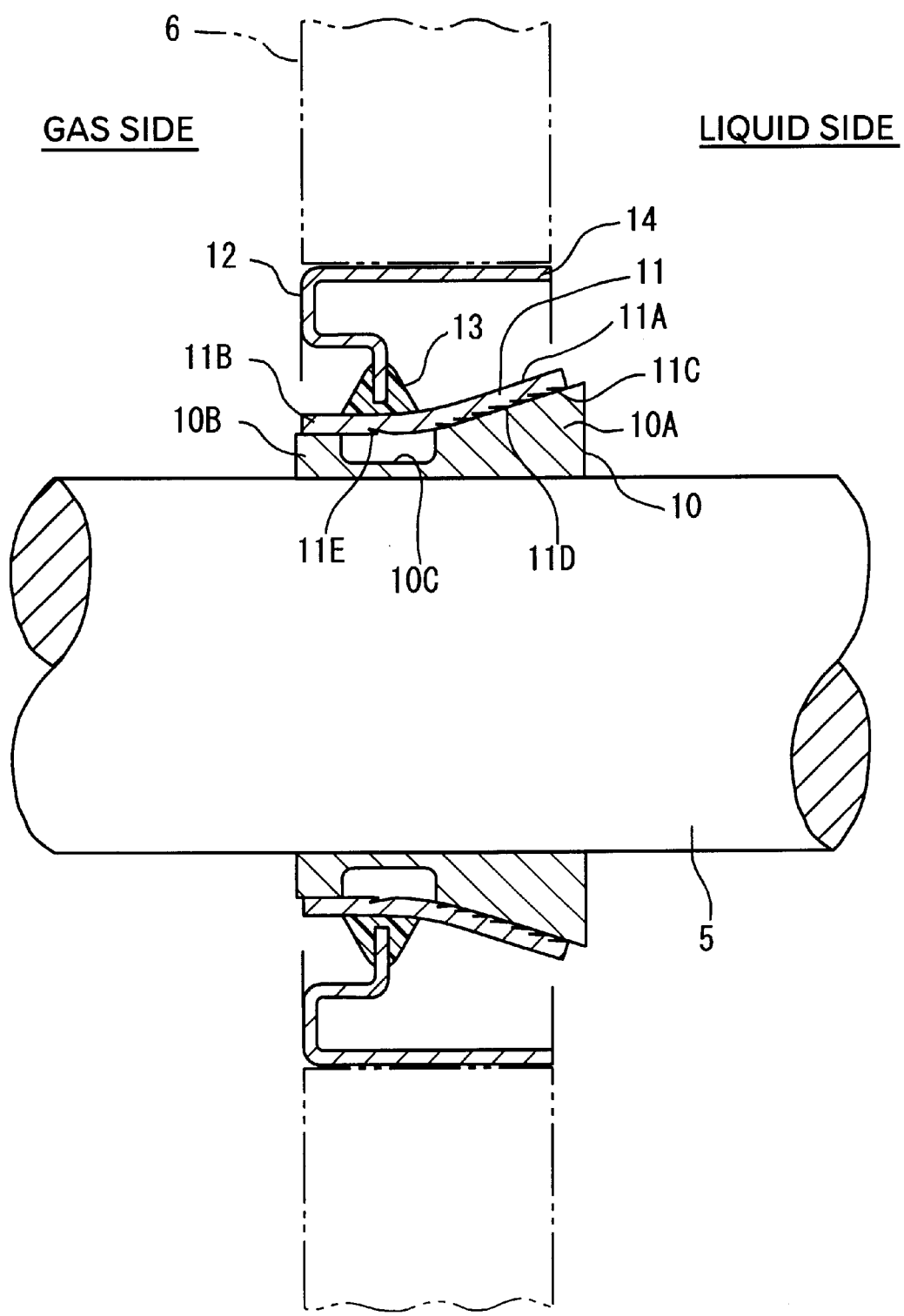
FIG. 1 is a vertical cross section showing a liquid seal structure of a first embodiment according to the present invention.

As shown in FIG. 1, a sleeve 10 made of metal, sintered alloy, and the like, is fixed to the rotation shaft 5, such as a crankshaft of an engine, by an appropriate means, such as press-fit, adhesion, or shrink fitting. A relatively wide tapered seal land 10A is formed on one side of the sleeve 10 (inside of the engine containing the liquid to be sealed= liquid side) and a dust seal land 10B narrower than the tapered seal land 10A is formed on the other side (outside of the engine exposed to the atmosphere=gas side). Further, a groove portion 10C constituting a liquid pool is integrally provided in the middle of the lands 10A and 10B.

An outer circumference of the tapered seal land 10A is tapered to have larger a diameter toward the liquid side. On the other hand, an outer circumference of the dust seal land 10B is approximately cylindrical.

A thin conic annular seal member 11 is fitted to an outer circumference of the sleeve 10. The seal member 11 is made of Teflon having flexibility, and has a tapered seal lip portion 11A in contact with the tapered seal land 10A and a dust seal lip portion 11B in contact with the dust seal land 10B.

An inner circumference of the tapered seal lip portion 11A is a seal surface 11C sliding relative to the tapered seal land 10A and has a helical groove 11D as a groove. The helical groove 11D is cut in a direction to push back the oil invaded to the seal surface 11C to function the pumping effect.

An annular liquid block 11E formed in a projection shape is provided by being cut into an inner circumference of the seal member 11 opposing to the groove portion 10C of the sleeve 10. On the upper half of the seal, the oil unable to be pushed back by the pumping effect of centrifugal force of the tapered seal portion and the pumping effect of the helical groove 11D runs into the liquid block 11E, so that the oil drops into the groove portion 10C. The oil, or the like, collected in the groove portion 10C moves into a lower position of the rotation shaft 5 and is collected to the inside of the engine, so that the oil, or the like, does not leak to the outside.

On an outer circumference of the seal member 11, an attachment member 13 made of soft material such as rubber having an approximately triangular configuration, is attached at a position corresponding to the groove portion 10C of the sleeve 10 by adhesion or shrink fit.

A metal ring 14 made of steel plate is attached to the attachment member 13, and the metal ring 14 is fitted to the housing 6 by press fit etc. A seal lip support member 12 is provided including the attachment member 13 and the metal ring 14.

When the oil on the liquid side invades into the seal surface 11C of the rotation shaft 5 by driving the internal combustion engine, and the likes having the seal of the aforesaid seal mechanism, the oil is pushed back to the liquid side on account of an effect by a centrifugal force of the rotation shaft 5 to raise the oil along the tapered seal surface to return to the liquid side and the pumping effect of the helical groove 11D.

Even when some of the oil is unable to be pushed back to the liquid side and is leaked on an upper half of the seal along the seal surface 11C, the oil runs into the liquid block 11E to be blocked, so that the oil drops onto the groove portion 10C of the sleeve 10 to move into the lower side of the shaft 5 through the groove 10C, thus being collected in the inside of the engine.

On the other hand, invasion of the dust and rainwater from the gas side to the liquid side can be prevented by the dust seal lip 11B.

According to the above-described embodiment, the following effects can be obtained.

(1) When the oil on the liquid side invades to the seal surface 11C between the tapered seal land 10A of the sleeve 10 and the tapered seal lip portion 11A, the oil goes up to the larger diameter side along the tapered seal surface of the tapered seal land 10A to be returned to the liquid side, thus preventing oil leakage. Accordingly, good sealability can be obtained to perform stable sealing for a long time to enhance reliability.

(2) Even when the oil invades to the seal surface 11C between the tapered seal land 10A and the tapered seal lip portion 11A and goes into the helical groove 11D, the oil is returned to the liquid side by the pumping effect of the helical groove 11D as well as the centrifugal force, so that the oil is returned to the liquid side, thus preventing oil leakage from the seal surface 11C. Accordingly, the sealability can be further improved, thus performing stable sealing for a long time to enhance reliability.

(3) Since the dust seal lip 11B is provided to the sleeve 10, invasion of the dust and rainwater from the gas side to the liquid side can be prevented. Accordingly, the dust and the rainwater does not invade to the seal surface 11C between the tapered seal land 10A and the tapered seal lip portion 11A, thus preventing damage on the seal surface 11C to improve durability of the seal mechanism.

(4) Since the groove portion 10C as the liquid pool is formed on the outer circumference of the sleeve 10, even when the oil is unable to be pushed back to the liquid side by the centrifugal force of the tapered portion and the pumping effect of the helical groove 11D transmits through the inner circumference of the seal member 11, the oil is collected in the groove portion 10C to move into the lower side of the shaft 5 to be recollected to the inside of the engine. Accordingly, the oil does not leak to the gas side, thus securing sealability to perform stable sealing for a long time to enhance reliability.

(5) Since the annular liquid block 11E is provided to a portion of on the inner circumference of the seal member 11 opposing to the groove portion 10C, the oil unable to be pushed back to the liquid side by the centrifugal force of the tapered portion and the pumping effect of the helical groove 11D runs into the liquid block 11E to be blocked. Accordingly, the oil does not go beyond the liquid block 11E (to the gas side) through the seal member 11 and does not leak to the gas side. As a result, the sealability can be secured, thus performing stable sealing for a long time to enhance reliability.

As described above, since the present invention has multiple seal functions, excellent sealability can be performed for a long time.

[Second Embodiment]

Figure 2:
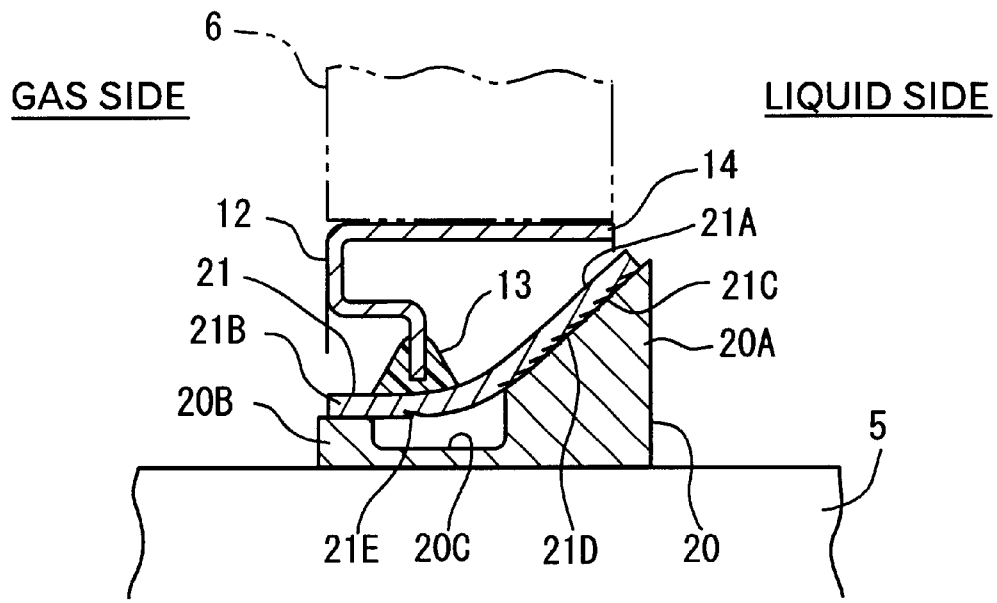
FIG. 2 is a vertical cross section showing a part of the liquid seal structure of a second embodiment according to the present invention.

Next, second embodiment of the present invention will be described below with reference to FIG. 2.

In the present second embodiment and below-described third to sixth embodiments, the same reference numeral will be attached to the same structure and the same component as the aforesaid first embodiment (the housing 6, the seal lip support member 12, the attachment member 13 and the metal ring 14) to omit or simplify the detailed description thereof.

The liquid seal structure according to the present embodiment has a steeper angle of tapered surface of a tapered seal land 20A of a sleeve 20 than the tapered surface of the tapered seal land 10A of the first embodiment.

Specifically, the tapered surface of the tapered seal land 20A has a steep angle of, for instance, 45 to 60 degrees relative to the dust seal land 20B. Accordingly, the inner circumference of a tapered seal lip 21A of seal member 21 has a steep seal surface 21C. A helical groove 21D is formed on the inner circumference of the tapered seal lip 21A and a groove portion 20C is formed on the sleeve 20. A dust seal lip 21B is in contact with an outer circumference of a dust seal land 20B and a liquid block 21E is provided to the inner circumference of the seal member 21 opposing to the groove portion 20C.

According to the liquid seal structure of the above-described second embodiment, the same function and the effects (1) to (5) as the aforesaid first embodiment can be obtained. Further, since the tapered angle of the seal surface 21C is steeper than the first embodiment, stronger centrifugal force and pumping effect can function, thus improving sealing effect.

[Third Embodiment]

Figure 3:
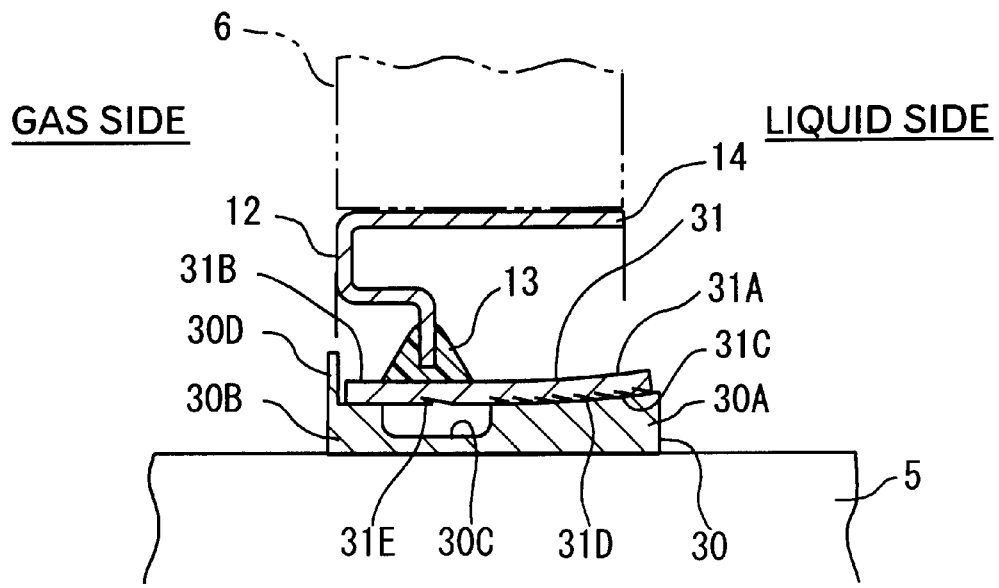
FIG. 3 is a vertical cross section showing a part of the liquid seal structure of a third embodiment according to the present invention.

Next, the third embodiment of the present invention will be described below with reference to FIG. 3.

The liquid seal structure according to the present embodiment has a tapered seal land 30A of a sleeve 30 with gentler tapered surface angle than the aforesaid first embodiment, and a fringe portion 30D provided to gas side end of the sleeve 30 radially projecting toward the outer circumference.

Specifically, the tapered surface of the tapered seal land 30A has a gentle angle, for instance, not more than 5 degrees relative to a dust seal land 30B of the sleeve 30.

A helical groove 31D is formed on an inner circumference of a tapered seal lip 31A, i.e. a seal surface 31C, and a groove portion 30C is formed on the sleeve 30.

The seal member 31 has the tapered seal lip 31A and the dust seal lip 31B as well as a liquid block 31E opposite to the groove portion 30C.

According to the liquid seal structure according to the third embodiment, the same function and the effects (1) to (5) as the aforesaid first embodiment can be obtained. Further, since the fringe portion 30D is provided to the sleeve 30, invasion of the dust, rainwater etc. can be prevented further efficiently. Furthermore, since the angle of the tapered surface is gentle, large movement in the axial direction can be allowed.

[Fourth Embodiment]

Figure 4:
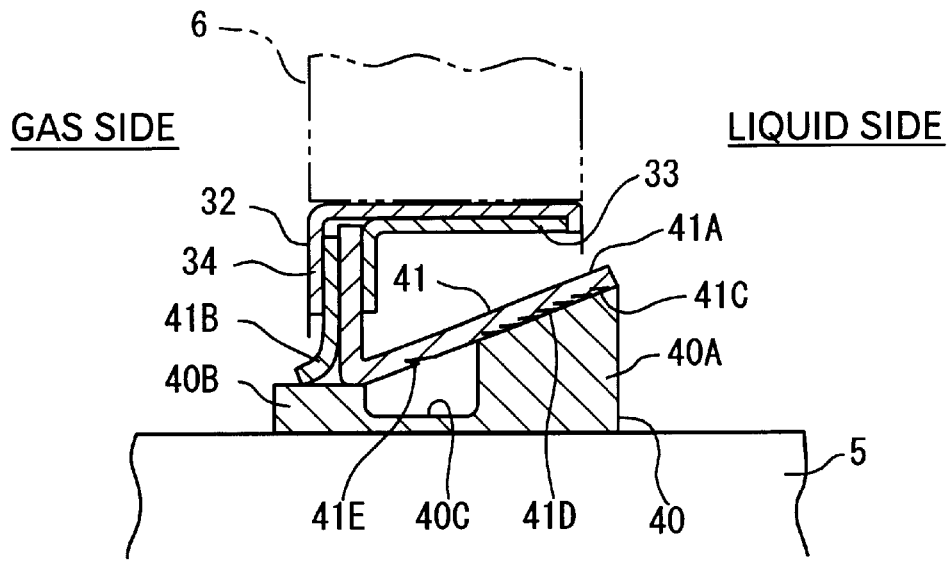
FIG. 4 is a vertical cross section showing a part of the liquid seal structure of a fourth embodiment according to the present invention.

The fourth embodiment of the present invention will be described with reference to FIG. 4.

The liquid seal structure of the present embodiment has a seal member 41 composed of independent tapered seal lip 41A and dust seal lip 41B.

Specifically, the tapered seal lip 41A has a seal surface 41C at one end thereof in contact with a tapered seal land 40A of a sleeve 40. The other end of the tapered seal lip 41A stretches over a groove portion 40C to be in contact with the dust seal land 40B and is bent in radial direction of the rotation shaft 5 toward outer circumference.

On the other hand, the dust seal lip 41B stands back to back with the other end of the tapered seal lip 41A and has an end in contact with the dust seal land 40B. The lips 41A and 41B are sandwiched and held by an inner case 33 and an outer case 34 constituting a seal lip support member 32. The inner case 33 and the outer case 34 are integrated by caulking, welding etc.

A helical groove 41D is provided on an inner circumference of the tapered seal lip 41A in contact with the tapered seal land 40A, and a groove portion 40C is formed on the sleeve 40. A liquid block 41E is provided to the seal member 41 opposite to the groove portion 40C.

According to the liquid seal structure of the fourth embodiment, the same function and the effects (1) to (5) as the aforesaid first embodiment can be obtained. Further, since the tapered seal lip portion 41A and the dust seal lip portion 41B are independent, the dust seal lip portion 41B can be configured in the most appropriate shape, thus improving dust-sealing property.

[Fifth Embodiment]

Figure 5:
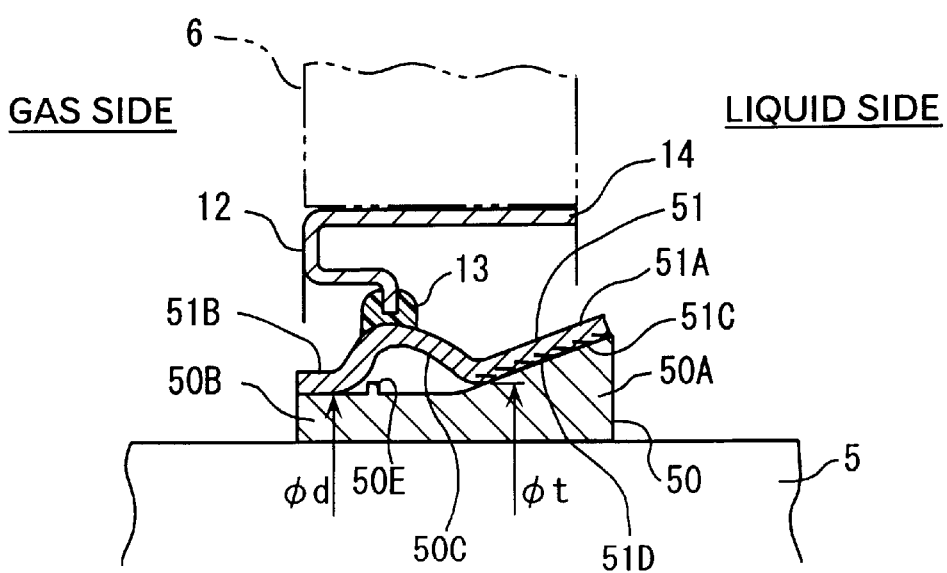
FIG. 5 is a vertical cross section showing a part of the liquid seal structure of a fifth embodiment according to the present invention.

Next, the fifth embodiment of the present invention will be described below with reference to FIG. 5.

The liquid seal structure according to the present embodiment has a projection 50C forming a liquid pool between a tapered seal lip portion 51A in contact with a tapered seal land 50A of a seal member 51 and a dust seal lip portion 51B in contact with a dust seal land 50B, the projection 50C being arranged by a ring-shaped projection protruding radially toward outside of the rotation shaft 5.

A helical groove 51D is provided on an inner circumference of the tapered seal lip portion 51A in contact with the tapered seal land 50A, i.e. seal surface 51C, and a liquid block 50E is provided on a sleeve opposing to the projection 50C.

In the above arrangement, the rotation shaft 5 has larger diameter $\Phi t$ on the liquid side, in other words, at an end of the liquid pool, in other words, the projection 50C in longitudinal direction where the tapered seal land 50A touches the tapered seal lip 51A than a diameter $\Phi d$ at another end in longitudinal direction where the dust seal land 50B touches the dust seal lip 51B.

According to the liquid seal structure of the fifth embodiment, the same function and the effects (1) to (3) as the aforesaid first embodiment can be obtained. Further, though the sleeve 50 has no groove portion, since the projection 50C as the liquid pool is formed to the seal member 51, and the projection collects the oil, the effect similar to effect (4) of the first embodiment can be obtained.

Further, since the projection 50C is arranged as a liquid pool and the sleeve 50 has the liquid block 50E, the oil is swung off the surface of the sleeve 50 by the rotation centrifugal force, so that the oil does not leak to the outside, thus securing sealability. Accordingly, stable sealing can be performed for a long time to enhance reliability.

[Sixth Embodiment]

Figure 6:
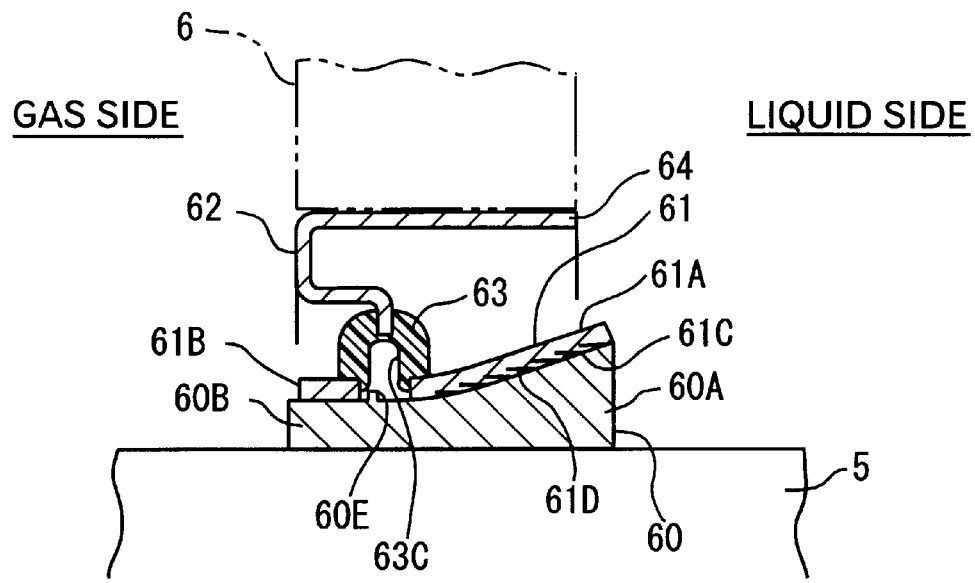
FIG. 6 is a vertical cross section showing a part of the liquid seal structure of a sixth embodiment according to the present invention.
Figure 7:
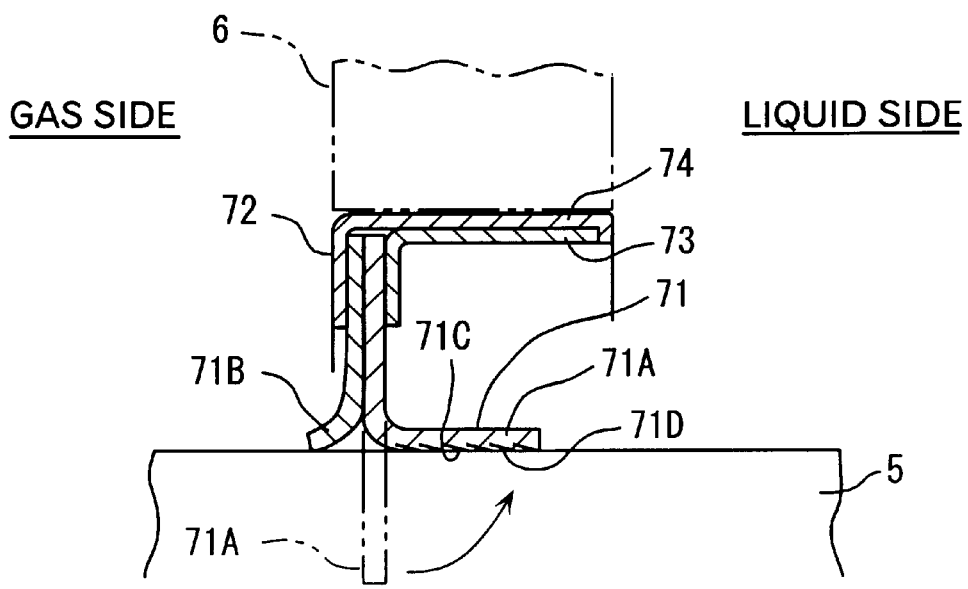
FIG. 7 is a vertical cross section showing a part of a liquid seal structure of conventional art.

The sixth embodiment of the present invention will be described below with reference to FIG. 6.

The liquid seal structure of the present embodiment has a seal member 61 composed of a separate tapered seal lip 61A and a dust seal lip 61B in a manner different from the aforesaid fourth embodiment.

Specifically, the tapered seal lip 61A is in contact with an outer circumference of the tapered seal land 60A of a sleeve 60 and the dust seal lip 61B is provided to a dust seal land 60B of the sleeve 60 spaced apart from the tapered seal lip 61A by a predetermined distance. An attachment member 63 constituting a seal lip support member 62 together with a metal ring 64 stretches over opposing ends of the lips 61A and 61B, the attachment member 63 being formed in U-shaped cross section by a soft material such as rubber in a ring-shape projecting from an outer circumference of the lips 61A and 61B toward outside. The U-shaped projection 63C works as the liquid pool, which collects oil invading from a thread groove 61D of a seal surface 61C to prevent leak to the outside of the gas side.

A liquid block 60E is provided to the sleeve 60 opposing to the projection 63C.

According to the liquid seal structure of the sixth embodiment, the same function and the effects (1) to (3) as the aforesaid first embodiment can be obtained. Further, though the sleeve 60 has no groove portion, since the projection 63C of the attachment member 63 is formed in a U-shaped cross section to form the liquid pool, the same effect as the effect (4) of the first embodiment can be obtained. Further, since the tapered seal lip portion 61A and the dust seal lip portion 61B are separate bodies, the dust seal lip 61B can be formed into an appropriate shape, thus improving dust sealing property.

[Modifications]

Incidentally, the scope of the present invention is not restricted to the aforesaid embodiments, but includes other modifications as long as an object of the present invention can be achieved.

For instance, though the fringe portion 30D is provided at an end of the dust seal land 30B of the sleeve 30, the fringe portion 30D is not requisite. Alternatively, a similar fringe portion as the fringe portion 30D may be provided on the sleeves 10 etc. of the aforesaid respective embodiments.

Though the aforesaid respective embodiments have the sleeve fixed to the rotation shaft 5 and the tapered seal land 10A and the dust seal land 10B are provided on the sleeve, other arrangement is possible. For instance, the tapered surface as the tapered seal land may be directly formed on the rotation shaft 5. Alternatively, the tapered seal land and the dust seal land may be formed as independent bodies respectively fixed to a predetermined position.

Further, in the fifth embodiment, the diameter $\Phi t$ on the sealing liquid side of the projection 50C is larger than the diameter $\Phi d$, which is not restricted solely to the fifth embodiment but is common to the respective embodiments. Specifically, even when the tapered angle is gentle as the third embodiment, the diameter on the sealing liquid side is set larger.

The liquid side and the gas side of the present invention is not restricted to the inside and outside of the engine with the engine oil sealed therein, but can be applied to the other circumstances. Specifically, the present invention can be applied in an arrangement where liquid is filled in the outside of the case and is prevented from invading into the inside. In this case, the outside of the case is the liquid side and the inside is the gas side.

Further, the liquid side and the gas side of the present invention are not restricted to an arrangement where only liquid or gas exists on respective sides. For instance, though the engine oil exists on the liquid side, the engine oil may not be constantly filled in the seal mechanism portion. Ordinarily, liquid surface of the engine oil is at a lower position and splash of the engine oil reaches the seal mechanism in accordance with the drive of the engine. In this case, the liquid side of the seal mechanism often is in contact with the gas. However, since the liquid to be sealed exists, it would be evident that the side can be called the "liquid side."

In the present invention, the same can be applied to the gas side. Specifically, the gas side of the present invention includes an arrangement having liquid as well as the gas. Further, in spite of the terminology of "gas side", sufficient effect can be obtained by applying the seal mechanism of the present invention when the gas does not exist on the gas side and there is only liquid therein.

What is claimed is:

1. A liquid seal structure for preventing liquid on a liquid side form leaking toward a gas side, comprising:

a tapered seal land provided about an outer circumference of a rotation shaft and having an outer circumference with a larger diameter on the liquid side than on the gas side;

a seal member having a tapered seal lip containing an inner surface extending in contact with the outer circumference of the tapered seal land to form a contact surface defining a seal surface therebetween so that the inner surface of the seal member contacts substantially the entire circumference of the tapered seal land; and a seal lip support member for supporting the tapered seal lip.

2. The liquid seal structure according to claim 1, wherein a groove is formed on at least one of the contact surfaces of the tapered seal land and the tapered seal lip.

3. The liquid seal structure according to claim 1, wherein a dust seal lip for preventing invasion of dust from the gas side to the liquid side is provided on the outer circumference of the rotation shaft.

4. The liquid seal structure according to claim 3, wherein the tapered seal lip and the dust seal lip are integrated.

5. The liquid seal structure according to claim 3, wherein the tapered seal lip and the dust seal lip are independently formed.

6. The liquid seal structure according to claim 1, a space defining a liquid pool for collecting the liquid is provided on the outer circumference of the tapered seal land.

7. The liquid seal structure according to claim 6, wherein said seal member covers the space defining the liquid pool; and an annular liquid block is provided on a surface of the seal member opposite to the liquid pool.

8. The liquid seal structure according to claim 6, wherein diameters at which the seal land and the seal lip contact each other on both ends of the liquid pool in an axial direction of the rotation shaft includes a larger diameter on the liquid side than on the gas side.

9. The liquid seal structure according to claim 6, wherein the seal member is integrated with at least one of the tapered seal lip and the dust seal lip.

10. The liquid seal structure according to claim 1, wherein an inner surface of the seal member is formed to define in cooperation with said seal land a liquid pool for collecting liquid.

11. The liquid seal structure according to claim 10, wherein said land is disposed opposite to the liquid pool and an annular liquid block is provided on a surface of the seal land opposite to the liquid pool.

12. The liquid seal structure according to claim 1, wherein the tapered seal land is independent from the rotation shaft.

13. The liquid seal structure according to claim 1 wherein the inner surface of the seal member extends about substantially the entire circumference of the tapered seal land.

\* \* \* \* \*